(12) United States Patent
Konttori et al.

(10) Patent No.: US 12,386,175 B1
(45) Date of Patent: Aug. 12, 2025

(54) AUGMENTING REALITY WITH LIGHT FIELD DISPLAY AND WAVEGUIDE DISPLAY

(71) Applicant: Distance Technologies Oy, Helsinki (FI)

(72) Inventors: Urho Konttori, Helsinki (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/734,263

(22) Filed: Jun. 5, 2024

(51) Int. Cl.
  *G02B 27/01* (2006.01)
  *A61B 3/10* (2006.01)
  *G02B 27/00* (2006.01)

(52) U.S. Cl.
  CPC .... *G02B 27/0093* (2013.01); *G02B 2027/014* (2013.01)

(58) Field of Classification Search
  CPC ......... A61B 3/02; A61B 3/102; A61B 3/1025; A61B 3/113; A61B 3/1015; A61B 3/1225; A61B 3/024; G02B 27/00; G02B 27/01; G02B 27/0101; G02B 27/0149; G02C 11/10; G02C 7/04
  USPC ......... 359/630–632; 351/200, 205–206, 209, 351/210, 221–223, 246
  See application file for complete search history.

(56) References Cited

U.S. PATENT DOCUMENTS

| | | | | |
|---|---|---|---|---|
| 2016/0238852 | A1* | 8/2016 | Ellsworth | G09G 5/006 |
| 2018/0275402 | A1* | 9/2018 | Popovich | G02B 6/0035 |
| 2018/0299953 | A1* | 10/2018 | Selker | G06T 19/006 |
| 2020/0128232 | A1* | 4/2020 | Hwang | A61B 5/0022 |
| 2022/0121027 | A1* | 4/2022 | Abele | H04N 9/3132 |
| 2023/0176378 | A1* | 6/2023 | Amirsolaimani | G02B 27/0093 |
| | | | | 359/630 |

* cited by examiner

*Primary Examiner* — Dawayne Pinkney
(74) *Attorney, Agent, or Firm* — Ziegler IP Law Group, LLC.

(57) ABSTRACT

An image is generated, based on a relative location of a head or eyes of a user with respect to a waveguide. An input is generated, based on a relative location of the head or the eyes with respect to an optical combiner. The image is displayed via a display of a waveguide display unit, while the input is employed at a light field display unit, to produce a synthetic light field. An optical combiner is employed to reflect a part of the synthetic light field emanating from the light field display unit towards the eyes of the user, while optically combining the part of the synthetic light field with a real-world light field. The part of the synthetic light field and the real-world light field are optically combined with another part of the synthetic light field emanating from the waveguide display unit.

18 Claims, 4 Drawing Sheets

AUGMENTING REALITY WITH LIGHT FIELD DISPLAY AND WAVEGUIDE DISPLAY

TECHNICAL FIELD

The present disclosure relates to systems for augmenting reality with light field displays and waveguide displays. The present disclosure also relates to methods for augmenting reality with light field displays and waveguide displays.

BACKGROUND

Heads-up displays (HUDs) are widely used in aviation, defence and automotive sectors. As an example, in the aviation sector, HUDs are used as a visual aid for landing in low-visibility conditions.

Conventionally, some HUDs use a projector system with complex optics to produce a collimated image having an optical focus at infinity or near infinity. However, such HUDs suffer from a very limited field of view (for example, in a range of 10 degrees×5 degrees to 20 degrees×10 degrees), and therefore, are viewable from very restricted viewing positions only. It is noteworthy that a relatively wider field of view is required for improved situational awareness, whether it is for a pilot or for a driver.

Other conventional HUDs use waveguides to present images at infinity or near infinity to users. However, such HUDs also suffer from the same problems, namely a very limited field of view. In part, this is due to difficult manufacturing processes, because of which only small-sized waveguide optics are feasible. Moreover, an image quality in such HUDs is also relatively poor. This is because a light efficiency in a waveguide is typically low. Furthermore, any attempts to increase the size of the waveguide also exhibits issues in scaling up a light source (namely, a display or a projector) to cover a relatively wider field of view.

Therefore, in light of the foregoing discussion, there exists a need to overcome the aforementioned drawbacks.

SUMMARY

The present disclosure seeks to provide a system and a method that are capable of providing a relatively wide field of view (for example, in a range of 20 degrees×20 degrees to 60 degrees×25 degrees, or even more) for presenting virtual content augmenting reality for one or more users. The aim of the present disclosure is achieved by a system and a method for augmenting reality with light field display and waveguide display, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
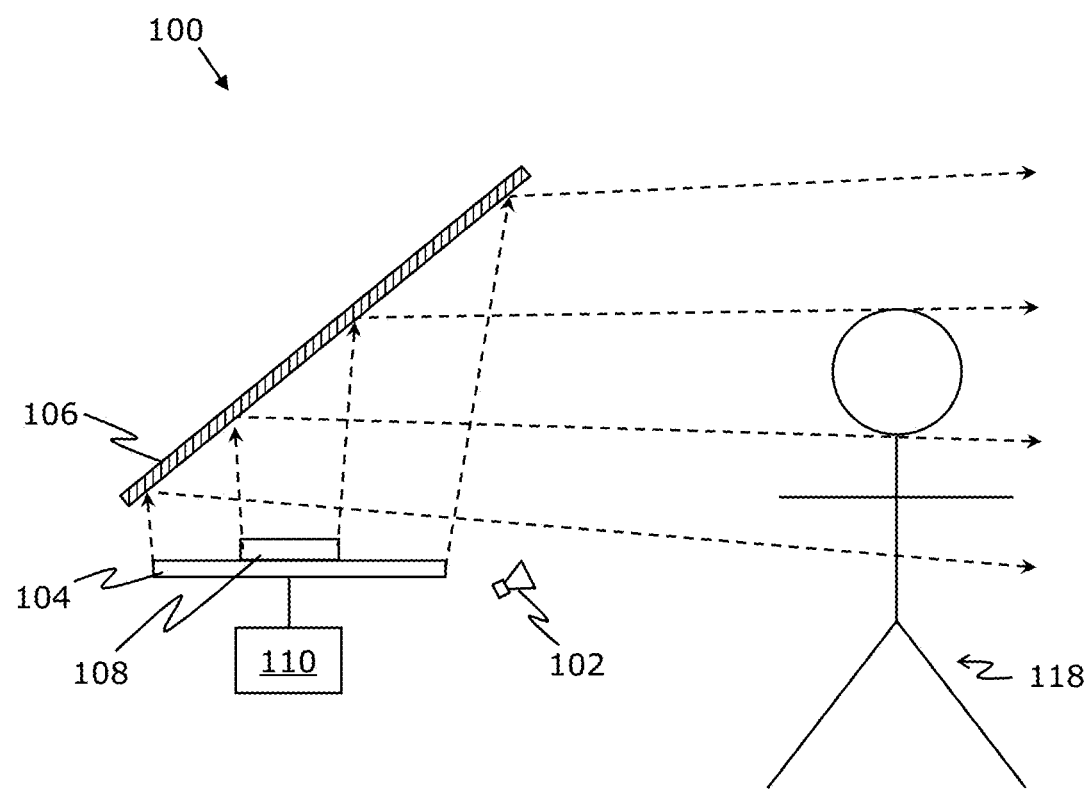
FIGS. 1A and 1B illustrate example implementations of a system for augmenting reality with a light field display and a waveguide display, in accordance with different embodiments of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  tracking means;
  at least one light field display unit;
  at least one optical combiner arranged on an optical path of the at least one light field display unit and on an optical path of a real-world light field of a real-world environment;
  at least one waveguide display unit comprising a display and a waveguide, the waveguide being arranged on the optical path of the at least one light field display unit; and
  at least one processor configured to:
    utilise the tracking means to determine a relative location of a head or eyes of at least one user with respect to the at least one optical combiner, and a relative location of the head or the eyes of the at least one user with respect to the waveguide;
    generate an input to be employed at the at least one light field display unit for producing a part of a synthetic light field, based on the relative location of the head or the eyes with respect to the at least one optical combiner;
    generate an image to be displayed via the display of the at least one waveguide display unit for producing another part of the synthetic light field, based on the relative location of the head or the eyes with respect to the waveguide; and
    display the image via said display of the at least one waveguide display unit, whilst employing the input at the at least one light field display unit, to produce the synthetic light field,
  wherein the at least one optical combiner is employed to reflect the part of the synthetic light field emanating from the at least one light field display unit towards the eyes of the at least one user, whilst optically combining said part of the synthetic light field with the real-world light field,
  further wherein said part of the synthetic light field and the real-world light field are optically combined with the another part of the synthetic light field emanating from the at least one waveguide display unit.

In a second aspect, an embodiment of the present disclosure provides a method comprising:
utilising tracking means to determine a relative location of a head or eyes of at least one user with respect to at least one optical combiner, and a relative location of the head or the eyes of the at least one user with respect to a waveguide, wherein the at least one optical combiner is arranged on an optical path of at least one light field display unit and on an optical path of a real-world light field of a real-world environment, and wherein the waveguide is arranged on the optical path of the at least one light field display unit, at least one waveguide display unit comprising a display and the waveguide;
generating an input to be employed at the at least one light field display unit for producing a part of a synthetic light field, based on the relative location of the head or the eyes with respect to the at least one optical combiner;
generating an image to be displayed via the display of the at least one waveguide display unit for producing another part of the synthetic light field, based on the relative location of the head or the eyes with respect to the waveguide; and
displaying the image via said display of the at least one waveguide display unit, whilst employing the input at the at least one light field display unit, to produce the synthetic light field,
wherein the at least one optical combiner is employed to reflect the part of the synthetic light field emanating from the at least one light field display unit towards the eyes of the at least one user, whilst optically combining said part of the synthetic light field with the real-world light field,
further wherein said part of the synthetic light field and the real-world light field are optically combined with the another part of the synthetic light field emanating from the at least one waveguide display unit.

The present disclosure provides the aforementioned system and the aforementioned method for augmenting reality with light field display and waveguide display based on relative locations of the head or the eyes of the at least one user. Synergistically employing the at least one light field display unit and the at least one waveguide display unit to produce the synthetic light field allows to provide a relatively wide field of view (for example, in a range of 20 degrees×20 degrees to 60 degrees×25 degrees, or even more) for presenting virtual content augmenting reality for one or more users. As a result, the virtual content presented by the system can be viewed through a relatively wide viewing angle. Moreover, the system and the method are susceptible to be employed in vehicles (for example, such as cars, aircrafts, or similar). Providing a relatively wide field of view (FOV) allows the system and the method to improve situational awareness for a driver or a pilot of a vehicle. Moreover, the aforesaid system and method enable to produce a realistic and high-quality synthetic light field that augments the real-world light field viewed by the at least one user. Furthermore, the system and the method are robust, fast, reliable, support real-time simultaneous presentation of virtual images to multiple users.

In some implementations, an FOV of the at least one waveguide display unit is narrower than an FOV of the at least one light field display unit. As discussed earlier, existing waveguides typically have a very limited FOV, due to inherent difficulties in their manufacturing process. It is noteworthy that the aforementioned system and method work well even with existing waveguides that have a very limited FOV. By employing the at least one light field display unit whose FOV is much larger than the FOV of the at least one waveguide display unit, the aforementioned system and method allow the at least one user to focus her/his attention to virtual content that is displayed at a relatively wide FOV using the at least one light field display unit, while allowing the at least one user to view certain virtual content that is presented at optical infinity (or near infinity) via the at least one waveguide display unit. As an example, the certain virtual content could be presented to provide visual information that is critical for the at least one user (for example, a virtual object depicting another aircraft that is approaching towards an aircraft whose pilot is the at least one user), and/or that enables the at least one user to perform a specific task.

Throughout the present disclosure, the term "tracking means" refers to a specialised equipment for detecting and/or following a location of a head or eyes of a given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracking means. When different types of images captured by the various different types of tracking cameras are utilised, the location of the head or the eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images.

It will be appreciated that the at least one tracking camera is arranged to face the at least one user, to facilitate tracking of the location of the head or the eyes. A relative location of the at least one tracking camera with respect to the at least one optical combiner is fixed, and is pre-known. This enables to determine the relative location of the head or the eyes of the at least one user with respect to the at least one optical combiner. Optionally, in this regard, when the tracking means are utilised to detect and/or follow the location of the head or the eyes, a location of the head or the eyes with respect to the at least one tracking camera is accurately known. Thus, the relative location of the head or the eyes with respect to the at least one optical combiner can be determined, based on the relative location of the at least one tracking camera with respect to the at least one optical combiner and the location of the head or the eyes with respect to the at least one tracking camera. Moreover, a relative location of the waveguide with respect to the at least one optical combiner (and/or with respect to the at least one tracking camera) is also pre-known. Thus, the relative location of the head or the eyes with respect to the waveguide can be calculated, based on the relative location of the head or the eyes with respect to the at least one optical combiner (and/or with respect to the at least one tracking camera), and the relative location of the waveguide with respect to the at least one optical combiner (and/or with respect to the at least one tracking camera).

In some implementations, the tracking means can be employed to track the head of the at least one user. This may be applicable when an accurate location of the eyes is not required, and may depend on a type of the at least one light field display unit. Notably, precise relative locations of both the eyes of the at least one user are not needed, when only a two-dimensional (2D) view of the virtual content is to be presented to the at least one user via the synthetic light field. In other implementations, the tracking means can be employed to track both the eyes of the at least one user with a significantly high accuracy and precision. This is particularly beneficial when the at least one light field display unit is implemented as an autostereoscopic display, wherein showing different virtual images to different eyes of a given user allow to present a three-dimensional view of virtual object(s). In such implementations, an error in determining the relative location of the eyes may, for example, be minimised to within a tolerance range of approximately (+/−) 8 millimetres.

It will be appreciated that the tracking means is employed to repeatedly track the location of the head or the eyes of a given user throughout a given session of using the system. This allows for repeatedly determining the relative location of the head or both the eyes with respect to the at least one optical combiner in real time or near-real time. Beneficially, this allows for presenting the at least one user with an augmented view of the synthetic light field with the real-world light field. In case of autostereoscopic displays, when the synthetic light field is being produced for a plurality of users simultaneously, relative locations of both eyes of each user from amongst the plurality of users are determined in a same manner as discussed hereinabove.

The at least one processor controls an overall operation of the system. The at least one processor is communicably coupled to the tracking means, the at least one light field display unit and the at least one waveguide display unit. Optionally, the at least one processor is implemented as a processor of the at least one light field display unit. Alternatively, optionally, the at least one processor is implemented as a processor of a computing device that is communicably coupled to the at least one light field display unit and the at least one waveguide display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "light field display unit" refers to a specialised equipment that is capable of producing a part of a synthetic light field. In other words, the at least one light field display unit is utilised to employ the input (that is generated by the at least one processor) to produce the part of the synthetic light field at a given resolution. Pursuant to embodiments of the present disclosure, different types of light field display units can be implemented. For example, the at least one light field display unit can be any one of: a hogel-based light field display unit, a lenticular array based light field display unit, a parallax-barrier based light field display unit, a hologram-projector based light field display unit, a scanning-laser based light field display unit, a CRT-like light field display unit. Accordingly, the input to be employed at the at least one light field display unit can be in various different forms, depending on a type of the at least one light field display unit that is implemented. As a first example, in case of a hogel-based light field display unit or a lenticular array based light field display unit or a parallax-barrier based light field display unit, the input can be in a form of a light field image comprising pixels. As a second example, in case of a hologram-projector based light field display unit, the input can be in a form of a holographic recording having a holographic interference pattern. As a third example, in case of a scanning-laser based light field display unit, the input can be in a form of any one of: image data, vector graphics, vector paths. As a fourth example, in case of a cathode ray tube (CRT)-like light field display unit, the input can be in a form of a video signal comprising analog electrical signals. Depending on the type of the at least one light field display unit, a light-emitting component of the at least one light field display unit may be implemented in various different forms, for example, such as a backlight, light-emitting diodes (LEDs), organic LEDs (OLEDs), micro LEDs, a laser, a spatial light modulator, among others. All the aforementioned forms of light field display units and their corresponding inputs are well known in the art.

As mentioned earlier, the input is generated based on the relative location of the head or the eyes of the at least one user with respect to the at least one optical combiner. It will be appreciated that in a case where the at least one user comprises a plurality of users, the same input is employed by the at least one light field display unit for producing the aforesaid part of the synthetic light field presenting the virtual content to the plurality of users simultaneously. Moreover, in case of autostereoscopic implementations, a resolution of a first sub-part and a second sub-part of said part of the synthetic light field being displayed to a first eye and a second eye of a given user, respectively, depends on a total number of users for which the input has been generated. For example, when said part of the synthetic light field is to be produced for a single user, the first sub-part of said part of the synthetic light field may be generated by 50 percent of the input, and the second sub-part of said part of the synthetic light field may be generated by a remaining 50 percent of the input. In such a case, an effective resolution per eye would be a half of a native display resolution of the at least one light field display unit. However, in autostereoscopic implementation where said part of the synthetic light field is to be produced for two users, for each of the two users, the first sub-part of said part of the synthetic light field may be generated by 25 percent of the input, and the second sub-part of said part of the synthetic light field may be generated by 25 percent of the input. In such a case, an effective resolution per eye would be one-fourth of the native display resolution of the at least one light field display unit. In other words, greater the number of users, lower is the resolution of the first sub-part and the second sub-part of the synthetic light field being displayed to a given user, and vice versa.

Upon reflection of the first sub-part and the second sub-part of said part of the synthetic light field from the at least one optical combiner, visual information corresponding to a first part of the input and a second part of the input is perceived by the first eye and the second eye of the given user, respectively, as a first virtual image and a second virtual image. In case of a light field image, the input may be understood to be a 2D image comprising a plurality of pixels, wherein the first part of the input comprises a first set of pixels from amongst the plurality of pixels that is responsible for generating the first sub-part of said part of the synthetic light field that corresponds to the first eye, and the second part of the input comprises a second set of pixels from amongst the plurality of pixels that is responsible for generating the second sub-part of said part of the synthetic light field that corresponds to the second eye. It will be appreciated that the pixels belonging to the first set are not arranged in a continuous manner across the light field image (namely, the input); similarly, the pixels belonging to the second set are also not arranged in a continuous manner across the light field image. Optionally, the pixels belonging to the first set and the pixels belonging to the second set may be arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the (single) light field image would comprise visual information corresponding to the first eye as well as the second eye of the at least one user.

In some implementations, the virtual content presented by the synthetic light field corresponds to a virtual environment comprising one or more virtual objects. Optionally, in this regard, the at least one processor is configured to generate the input from a perspective of the relative location of the head or the eyes of the at least one user with respect to the at least one optical combiner, by employing a three-dimensional (3D) model of the virtual environment. The term "virtual object" refers to a computer-generated object (namely, a digital object). Examples of the one or more virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the one or more virtual objects. Such a comprehensive information is indicative of at least one of: a plurality of features of the one or more virtual objects or their portions, a shape and a size of the one or more virtual objects or their portions, a pose of the one or more virtual objects or their portions, a material of the one or more virtual objects or their portions, a colour and an optical depth of the one or more virtual objects or their portions. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain the first virtual image and the second virtual image to be presented to the first eye and the second eye of the at least one user in a form of 2D user interface (UI) elements. The 2D UI elements could pertain to, for example, a virtual navigation tool, a virtual gadget, a virtual message, a virtual entity, a virtual entertainment media, a virtual information, or similar.

Furthermore, optionally, when the input is in a form of the light field image, the first part of the input and the second part of the input comprise the first set of pixels and the second set of pixels corresponding to the first eye and the second eye of the at least one user, respectively, wherein when generating the input, the at least one processor is configured to determine, within the light field image, a position of a given pixel of the first set and a position of a given pixel of the second set that correspond to a given synthetic three-dimensional (3D) point, based on an inter-pupillary distance between the first eye and the second eye of the at least one user and an optical depth at which the given synthetic 3D point is to be displayed. The technical benefit of determining said positions is that the given synthetic 3D point can be presented accurately and realistically, by utilising binocular disparity, based on the inter-pupillary distance and the optical depth at which the given synthetic 3D point is to be displayed.

In implementations where the virtual content presented by the synthetic light field corresponds to the one or more virtual objects, the at least one processor is configured to determine a colour of the given pixel of the first set and a colour of the given pixel of the second set, by employing the 3D model of the virtual environment. Optionally, a colour of a given pixel is represented by a colour value. Such a colour value could, for example, be an RGB value, an RGB-A value, a CMYK value, a YUV value, an RGB-D value, an RYYB value, an RGGB value, an RGB-IR value, or similar. Optionally, the at least one processor is configured to employ at least one neural network for determining the colour of the given pixel. Optionally, the at least one neural network is implemented as a Neural Radiance Field (NeRF) model. The NeRF model is well-known in the art.

Throughout the present disclosure, the term "real-world light field" refers to a light field emanating from the real-world environment in which the at least one user is present. Throughout the present disclosure, the term "synthetic light field" refers to a light field that is produced (namely, generated) synthetically by the at least one light field display unit and the at least one waveguide display unit. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the first eye and the second eye of the at least one user. In this way, visual information (for example, such as colour information, optical depth information, and the like) pertaining to said real-world objects is typically perceived by the left eye and the right eye. On the other hand, in case of the synthetic light field, light emanating from the at least one light field display unit (upon reflecting off the optical combiner) and the at least one waveguide display unit, is incident on the first eye and the second eye of the at least one user. In this way, visual information pertaining to the one or more virtual objects (namely, the virtual content) can be perceived by the first eye and the second eye.

Pursuant to embodiments of the present disclosure, the waveguide of the at least one waveguide display unit could be arranged anywhere on the optical path of the at least one light field display unit. In some implementations, the waveguide could be arranged between the at least one light field display unit and the at least one optical combiner. One example of such an implementation has been illustrated in conjunction with FIG. 1A. In other implementations, the waveguide could be arranged after the at least one optical combiner in the optical path of the at least one light field display unit. In other words, the waveguide could be arranged between the at least one optical combiner and the at least one user. One example of such an implementation has been illustrated in conjunction with FIG. 1B. In yet other implementations, the waveguide could be implemented as the at least one optical combiner itself. In such implementations, a user-facing surface of the waveguide may act as a semi-reflective surface of the at least one optical combiner. It will be appreciated that the waveguide may be flat or curved.

It will be appreciated that in some implementations, the at least one light field display unit comprises a single light field display unit, wherein the at least one optical combiner comprises a single optical combiner. In other implementations, the at least one light field display unit comprises a plurality of light field display units, wherein the at least one optical combiner comprises a plurality of optical combiners corresponding to respective ones of the plurality of light field display units. This may be highly beneficial to be implemented in an aircraft cockpit. It will be appreciated that in such implementations, the at least one waveguide display unit may also comprise a plurality of waveguide display units; however, the plurality of waveguide display units need not be arranged on an optical path of all of the plurality of light field display units. One example of such an implementation has been illustrated in conjunction with FIG. 3.

The at least one optical combiner is employed to reflect the part of the synthetic light field emanating from the at least one light field display unit towards the eyes of the at least one user, whilst optically combining said part of the synthetic light field with the real-world light field. Such reflection is facilitated by the semi-reflective surface of the at least one optical combiner, whilst allowing the real-world light field to pass through. Optionally, a tilt angle of the at least one optical combiner with respect to an image plane of the at least one light field display unit lies in a range of 10 degrees and 75 degrees. The at least one optical combiner could be implemented as at least one of: a lens, a mirror, a semi-transparent mirror, a semi-transparent film, a semi-transparent flexible membrane, a prism, a beam splitter, an optical waveguide, a polarizer. Optical combiners are well-known in the art.

Depending on the arrangement of the waveguide with respect to the at least one light field display unit and the at least one optical combiner, the at least one optical combiner may or may not be employed to reflect the another part of the synthetic light field (emanating from the at least one waveguide display unit) towards the eyes of the at least one user. This is apparent from different implementations illustrated in conjunction with FIGS. 1A and 1B. Nonetheless, as the waveguide is arranged on the optical path of the at least one light field display unit, the another part of the synthetic light field is optical combined with said part of the synthetic light field and the real-world light field. This is because the waveguide allows light to pass therethrough.

In operation, light waves emanating from the display are received at an in-coupling grating of the waveguide, and guided along a propagation path of the waveguide. An out-coupling grating of the waveguide extracts the guided light waves from the waveguide, and redirect them towards an output port of the waveguide. Upon exiting from the output port, the light waves are presented as the another part of the synthetic light field to the at least one user. It will be appreciated that how a waveguide works is well known in the art. It will also be appreciated here that the term "display" encompasses both a light-emitting-surface-based display as well as a projector-based display. Such displays are well known in the art.

As mentioned earlier, the image to be displayed via the display of the at least one waveguide display unit is generated based on the relative location of the head or the eyes with respect to the waveguide. When displayed via the at least one waveguide display unit, this image presents the virtual content at optical infinity or near infinity. It will be appreciated that the waveguide can be configured to present the virtual content at a customizable fixed distance. The customizable fixed distance corresponds to near infinity, for purposes of the present disclosure. As an example, the virtual content can be presented at an optical distance of approximately 20 metres. It will be appreciated that this image is a regular 2D image, and is not a light field image. Even though the image presents a 2D view of the virtual content to the at least one user, the image is generated based on the relative location of the head or the eyes with respect to the waveguide. This allows for presenting the 2D view of the virtual content from a perspective of the location of the head or the eyes of the at least one user. This, in turn, allows to produce a realistic and high-quality synthetic light field that augments the real-world light field viewed by the at least one user.

In implementations where the virtual content corresponds to the one or more virtual objects, the at least one processor is configured to generate the image from a perspective of the relative location of the head or the eyes of the at least one user with respect to the waveguide, by employing the 3D model of the virtual environment. In other implementations, the at least one processor is configured to generate the image in a form of a 2D UI element.

Optionally, when generating the image, the at least one processor is configured to determine at least one virtual object or a portion of the at least one virtual object that lies within the FOV of the at least one waveguide display unit from a perspective of the eyes of the at least one user, based on the relative location of the head or the eyes with respect to the waveguide, wherein the image to be displayed via the display of the at least one waveguide display unit is generated based further on the at least one virtual object or the portion of the at least one virtual object.

A technical benefit of generating the image based on the at least one virtual object or its portion that lies within the FOV of the at least one waveguide display unit from the perspective of the eyes of the at least one user is that it allows the another part of the synthetic light field emanating from the at least one waveguide display unit to present the virtual content in a more realistic manner. In order to determine whether the at least one virtual object or its portion lies within the FOV of the at least one waveguide display unit from the perspective of the eyes of the at least one user, a virtual representation of the at least one virtual object could be generated or retrieved, based on the relative location of the head or a given eye of the at least one user with respect to the at least one optical combiner, and a 3D location of the at least one virtual object in the virtual environment. This can be performed using the 3D model of the virtual environment. It will be appreciated that in autostereoscopic implementations of the at least one light field display unit, this would be performed for both the eyes separately. This advantageously takes into consideration the following: (i) all the virtual content may not be necessarily visible to both the eyes; (ii) one eye may not be able to see a particular part of the virtual content due to occlusion, while another eye may be able to see that particular part of the virtual content, (iii) there could be different virtual content for different users, (iv) a visual appearance of the at least one virtual object is similar (within a predefined threshold) for all the different users in whose FOV lies a virtual image region of the waveguide where the at least one virtual object would be displayed.

Moreover, optionally, when generating the input, the at least one processor is configured to determine at least one other virtual object and/or a remaining portion of the at least one virtual object that lies outside the FOV of the at least one waveguide display unit, but lies within the FOV of the at least one light field display unit from the perspective of the eyes of the at least one user, based on the relative location of the head or the eyes with respect to the waveguide, and the relative location of the head or the eyes with respect to the at least one optical combiner, wherein the input to be employed at the at least one light field display unit is generated based further on the at least one other virtual object and/or the remaining portion of the at least one virtual object.

A technical benefit of generating the input based on the at least one other virtual object and/or the remaining portion of the at least one virtual object (that lies outside the FOV of the at least one waveguide display unit, but lies within the FOV of the at least one light field display unit from the perspective of the eyes of the at least one user) is that it allows said part of the synthetic light field (emanating from the at least one light field display unit) to present a remaining part of the virtual content in a more realistic manner, thereby extending the FOV presented to the at least one user. In other words, the at least one light field display unit is employed to present the at least one other virtual object and/or the remaining portion of the at least one virtual object, when the at least one user is not viewing the waveguide from an optimal location. This allows the at least one user to focus her/his attention to the virtual content that is displayed at the relatively wider FOV using the at least one light field display unit, while allowing the at least one user to view a certain part of the virtual content that is presented at optical infinity (or near infinity) via the at least one waveguide display unit. This can be leveraged to present the at least one user with visual information that is critical for the at least one user (for example, a virtual object depicting another aircraft that is approaching towards an aircraft whose pilot is the at least one user), and/or that enables the at least one user to perform a specific task.

In order to determine whether the at least one other virtual object and/or the remaining portion of the at least one virtual object lies outside the FOV of the at least one waveguide display unit, but lies within the FOV of the at least one light field display unit from the perspective of the eyes of the at least one user, a virtual representation of the at least one other virtual object and/or the at least one virtual object could be generated or retrieved, based on the relative location of the head or a given eye of the at least one user with respect to the at least one optical combiner, and a 3D location of the at least one other virtual object and/or the at least one virtual object in the virtual environment. This can be performed using the 3D model of the virtual environment. It will be appreciated that in autostereoscopic implementations of the at least one light field display unit, this would be performed for both the eyes separately.

Furthermore, optionally, the at least one processor is configured to determine whether an optical depth at which the at least one virtual object is to be presented by the synthetic light field is greater than a predefined threshold depth, wherein the image to be displayed via the display of the at least one waveguide display unit is generated based further on the at least one virtual object or the portion of the at least one virtual object, only when it is determined that said optical depth is greater than the predefined threshold depth. Optionally, the input to be employed at the at least one light field display unit is generated based further on the at least one virtual object or the portion of the at least one virtual object, when it is determined that said optical depth is not greater than the predefined threshold depth.

Optionally, in this regard, the predefined threshold depth lies in a range of 4 metres to 20 metres; more optionally, in a range of 4 metres to 10 metres. As an example, the predefined threshold depth may be 5 metres. This means that only virtual objects that are to be presented at optical infinity (or near infinity) are presented using the at least one waveguide display unit. This takes into consideration a fact that when displayed via the at least one waveguide display unit, the image presents a 2D view of the virtual content to the at least one user. Therefore, any virtual object that is to be presented at an optical depth smaller than the predefined threshold depth would beneficially be presented via the at least one light field display unit. In autostereoscopic implementations of the at least one light field display unit, this would imply that such virtual objects are being presented by utilising binocular disparity to present a 3D view of these virtual objects to the at least one user. Accordingly, the at least one waveguide display unit can be employed to present robust, collimated images, only when needed.

Optionally, the at least one processor is configured to determine whether the at least one waveguide display unit has at least one of: a higher brightness, a higher resolution, a higher contrast, a higher dynamic range of colours, as compared to the at least one light field display unit, wherein the image to be displayed via the display of the at least one waveguide display unit is generated based further on the at least one virtual object or the portion of the at least one virtual object, only when it is determined that the at least one waveguide display unit has at least one of: a higher brightness, a higher resolution, a higher contrast, a higher dynamic range of colours, as compared to the at least one light field display unit. Optionally, the input to be employed at the at least one light field display unit is generated based further on the at least one virtual object or the portion of the at least one virtual object, when it is determined that the at least one waveguide display unit does not have at least one of: a higher brightness, a higher resolution, a higher contrast, a higher dynamic range of colours, as compared to the at least one light field display unit. A technical benefit of this is that one of the at least one light field display unit and the at least one waveguide display unit whose at least one display property is superior (than another of the at least one light field display unit and the at least one waveguide display unit) is utilised to present the at least one virtual object.

As an example, if the at least one waveguide display unit has a higher brightness (for example, expressed in terms of nits) than the at least one light field display unit, it means that the at least one waveguide display unit is capable of emitting more light as compared to the at least one light field display unit, and vice versa. This potentially results in a brighter and more vivid display of the at least one virtual object or its portion, when displayed through the at least one waveguide display unit. This is particularly beneficial in bright outdoor environments.

As another example, if the at least one waveguide display unit has a higher resolution (for example, expressed in terms of pixels per degree) than the at least one light field display unit, it means that the at least one waveguide display unit is capable of displaying sharper and more detailed visual information as compared to the at least one light field display unit, and vice versa. This may be particularly noticeable when fine text or other fine details need to be presented to the at least one user. This is beneficial for presenting a realistic view of the virtual content.

As yet another example, if the at least one waveguide display unit has a higher contrast (for example, expressed in terms of a ratio between brightest and darkest parts of an image that can be display) than the at least one light field display unit, it means that the at least one waveguide display unit is capable of producing more vibrant colours, deeper blacks, and better overall image quality as compared to the at least one light field display unit, and vice versa. This can be particularly beneficial for specific tasks where visual fidelity is important.

As still another example, if the at least one waveguide display unit has a higher dynamic range of colours (for example, expressed in bit depth) than the at least one light field display unit, it means that the at least one waveguide display unit is capable of producing a wider range of distinct colours, especially in terms of brightness and saturation, and therefore, more accurate colours across a wider spectrum, as compared to the at least one light field display unit, and vice versa. This results in more lifelike images with greater contrast between light and dark areas, thereby presenting a more realistic view of the virtual content.

Optionally, the at least one processor is configured to determine, based on a tag assigned to the at least one virtual object, whether the at least one virtual object is to be displayed via the at least one light field display unit or the at least one waveguide display unit, wherein the image to be displayed via the display of the at least one waveguide display unit is generated based further on the at least one virtual object or the portion of the at least one virtual object, only when it is determined that the at least one virtual object is to be displayed via the at least one waveguide display unit. Optionally, the input to be employed at the at least one light field display unit is generated based further on the at least one virtual object or the portion of the at least one virtual object, when it is determined that the at least one virtual object is to be displayed via the at least one light field display unit. Such tags may be pre-assigned to each of the one or more virtual objects of the virtual environment, and pre-stored in the 3D model. As an example, any virtual object that is low contrast and/or is of low importance (for example, such as clouds in the sky, or similar) might not need to be displayed on the at least one waveguide display unit. Such importance may be applicable for certain specific scenarios or may be applicable at all times. As an example, visual information pertaining to instrumentation (for example, such as a speed gauge and warning lights of a vehicle) may be considered important.

A technical benefit of this is that the at least one waveguide display unit is utilised to selectively present only those virtual objects that are high contrast and/or that are of high importance to the at least one user. This allows to reduce unnecessary clutter in the virtual content being presented to the at least one user via the at least one waveguide display unit. This allows the system and the method to work to their advantage, even with existing waveguides that have a very limited FOV.

Moreover, optionally, the at least one processor is configured to:
  determine a portion of the at least one optical combiner that overlaps with the FOV of the at least one waveguide display unit from the perspective of the eyes of the at least one user, based on the relative location of the head or the eyes with respect to the waveguide, and the relative location of the head or the eyes with respect to the at least one optical combiner; and
  when generating the input to be employed at the at least one light field display unit, generate a part of the input whose corresponding part of the synthetic light field is to be reflected from said portion of the at least one optical combiner towards the eyes of the at least one user, based on the at least one virtual object or the portion of the at least one virtual object.

Thus, the same virtual object (that is being displayed through the at least one waveguide display unit) is displayed through the at least one light field display unit. A technical benefit of this is that the at least one light field display unit can be employed to boost a perceived brightness of the same virtual object that is being displayed through the at least one waveguide display unit. As the at least one waveguide display unit is arranged on the optical path of the at least one light field display unit, and allows light to pass therethrough, the corresponding part of the synthetic light field emanating from the at least one light field display unit can be utilised to supplement the another part of the synthetic light field emanating from the at least one waveguide display unit. This potentially results in a brighter and more vivid display of the at least one virtual object or its portion, thereby improving the overall image quality being presented to the at least one user.

The present disclosure also relates to the method as described above. Various embodiments and variants disclosed above, with respect to the aforementioned first aspect, apply mutatis mutandis to the method.

Optionally, in the method, the FOV of the at least one waveguide display unit is narrower than the FOV of the at least one light field display unit.

Optionally, the step of generating the image comprises determining at least one virtual object or a portion of the at least one virtual object that lies within the FOV of the at least one waveguide display unit from a perspective of the eyes of the at least one user, based on the relative location of the head or the eyes with respect to the waveguide, wherein the image to be displayed via the display of the at least one waveguide display unit is generated based further on the at least one virtual object or the portion of the at least one virtual object. Optionally, the step of generating the input comprises determining at least one other virtual object and/or a remaining portion of the at least one virtual object that lies outside the FOV of the at least one waveguide display unit, but lies within the FOV of the at least one light field display unit from the perspective of the eyes of the at least one user, based on the relative location of the head or the eyes with respect to the waveguide, and the relative location of the head or the eyes with respect to the at least one optical combiner, wherein the input to be employed at the at least one light field display unit is generated based further on the at least one other virtual object and/or the remaining portion of the at least one virtual object.

Optionally, the method further comprises determining whether an optical depth at which the at least one virtual object is to be presented by the synthetic light field is greater than a predefined threshold depth, wherein the image to be displayed via the display of the at least one waveguide display unit is generated based further on the at least one virtual object or the portion of the at least one virtual object, only when it is determined that said optical depth is greater than the predefined threshold depth. Optionally, the input to be employed at the at least one light field display unit is generated based further on the at least one virtual object or the portion of the at least one virtual object, when it is determined that said optical depth is not greater than the predefined threshold depth.

Optionally, the method further comprises determining whether the at least one waveguide display unit has at least one of: a higher brightness, a higher resolution, a higher contrast, a higher dynamic range of colours, as compared to the at least one light field display unit, wherein the image to be displayed via the display of the at least one waveguide display unit is generated based further on the at least one virtual object or the portion of the at least one virtual object, only when it is determined that the at least one waveguide display unit has at least one of: a higher brightness, a higher resolution, a higher contrast, a higher dynamic range of colours, as compared to the at least one light field display unit.

Optionally, the method further comprises determining, based on a tag assigned to the at least one virtual object, whether the at least one virtual object is to be displayed via the at least one light field display unit or the at least one waveguide display unit, wherein the image to be displayed via the display of the at least one waveguide display unit is generated based further on the at least one virtual object or the portion of the at least one virtual object, only when it is determined that the at least one virtual object is to be displayed via the at least one waveguide display unit.

Optionally, the method further comprises determining a portion of the at least one optical combiner that overlaps with the FOV of the at least one waveguide display unit from the perspective of the eyes of the at least one user, based on the relative location of the head or the eyes with respect to the waveguide, and the relative location of the head or the eyes with respect to the at least one optical combiner, wherein the step of generating the input comprises generating a part of the input whose corresponding part of the synthetic light field is to be reflected from said portion of the at least one optical combiner towards the eyes of the at least one user, based on the at least one virtual object or the portion of the at least one virtual object.

DETAILED DESCRIPTION OF THE DRAWINGS

Figure 1B:
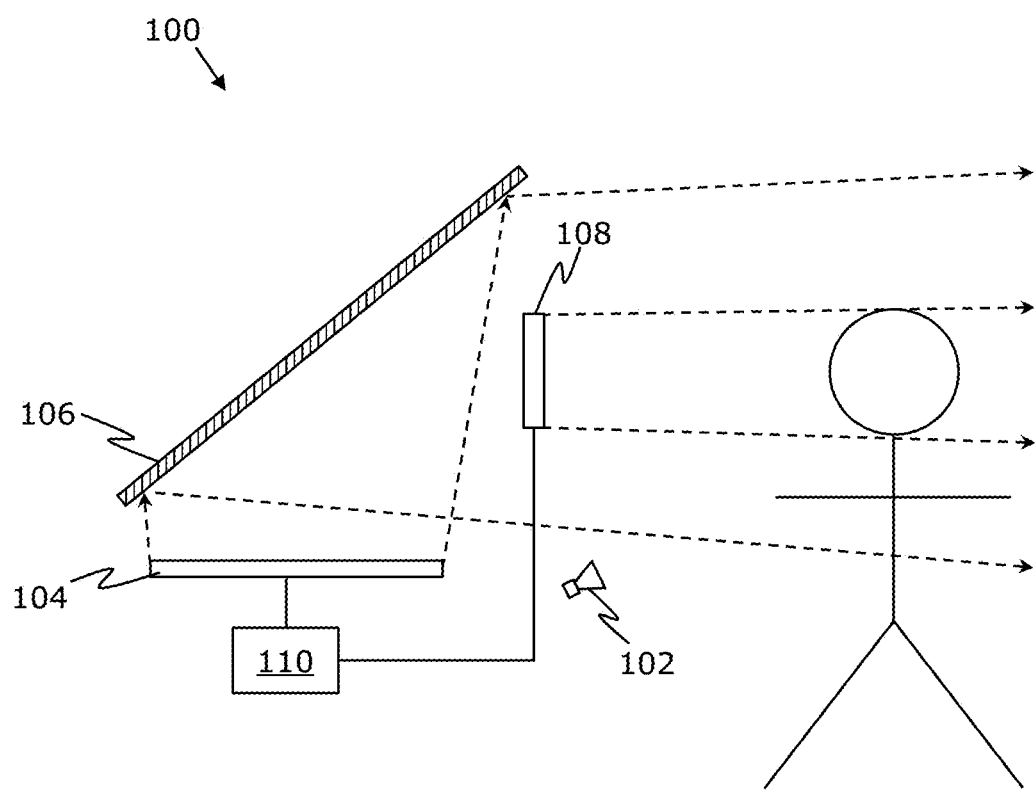
Figure 1C:
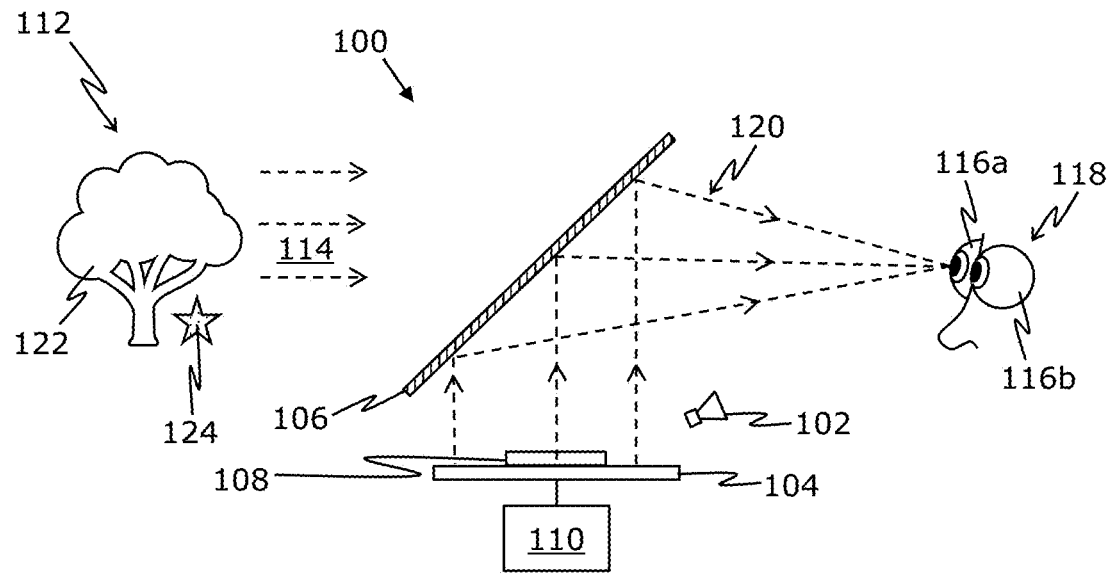
FIG. 1C illustrates how the system can be implemented in a real-world environment, in accordance with an embodiment of the present disclosure.

Referring to FIGS. 1A and 1B, illustrated are example implementations of a system 100 for augmenting reality with a light field display and a waveguide display, in accordance with different embodiments of the present disclosure. The system 100 comprises tracking means 102; at least one light field display unit, depicted as a light field display unit 104; at least one optical combiner, depicted as an optical combiner 106; at least one waveguide display unit 108 comprising a display and a waveguide; and at least one processor depicted as a processor 110. FIG. 1C illustrates how the system 100 can be implemented in a real-world environment 112, in accordance with an embodiment of the present disclosure. The optical combiner 106 is arranged on an optical path of the light field display unit 104 and on an optical path of a real-world light field 114 of the real-world environment 112, while the waveguide is arranged on the optical path of the light field display unit 104. The at least one processor is configured to:

utilise the tracking means 102 to determine a relative location of a head or eyes 116a-b of at least one user (depicted as a user 118) with respect to the optical combiner 106, and a relative location of the head or the eyes 116a-b with respect to the waveguide;

generate an input to be employed at the light field display unit 104 for producing a part of a synthetic light field 120, based on the relative location of the head or the eyes 116a-b with respect to the optical combiner 106;

generate an image to be displayed via the display of the waveguide display unit 108 for producing another part of the synthetic light field 120, based on the relative location of the head or the eyes 116a-b with respect to the waveguide; and display the image via said display of the waveguide display unit 108, whilst employing the input at the light field display unit 104, to produce the synthetic light field 120.

The optical combiner 106 is employed to reflect the part of the synthetic light field 120 emanating from the light field display unit 104 towards the eyes 116a-b of the user 118, whilst optically combining said part of the synthetic light field 120 with the real-world light field 114. Said part of the synthetic light field 120 and the real-world light field 114 are optically combined with the another part of the synthetic light field 120 emanating from the waveguide display unit 108. In the real-world environment 112, there are one or more real-world objects, depicted as a real-world object 122 (shown as a tree). The synthetic light field 120 presents virtual content pertaining to at least one virtual object, depicted as a virtual object 124 (shown as a star). For illustration purposes only, the virtual object 124 is shown to be presented at an optical depth that is almost same as an optical depth of the real-world object 122.

In FIG. 1A, the waveguide of the waveguide display unit 108 is shown to be arranged between the light field display unit 104 and the optical combiner 106. In FIG. 1B, the waveguide is shown to be arranged after the optical combiner 106 in the optical path of the light field display unit 104, namely between the optical combiner 106 and the user 118, when in use.

It may be understood by a person skilled in the art that FIGS. 1A-C includes a simplified example implementation of the system 100, for sake of clarity, which should not unduly limit the scope of the claims herein. It is to be understood that the specific implementation of the system 100 is not to be construed as limiting it to specific numbers or types of tracking means, light field display units, optical combiners, waveguide display units, and processors. The person skilled in the art will recognize many variations, alternatives, and modifications of embodiments of the present disclosure. For example, the waveguide could be implemented as the optical combiner 106 itself. In such a case, a user-facing surface of the waveguide may act as a semi-reflective surface of the optical combiner 106. Accordingly, the waveguide and the optical combiner 106 would be implemented as a single component.

Figure 2:
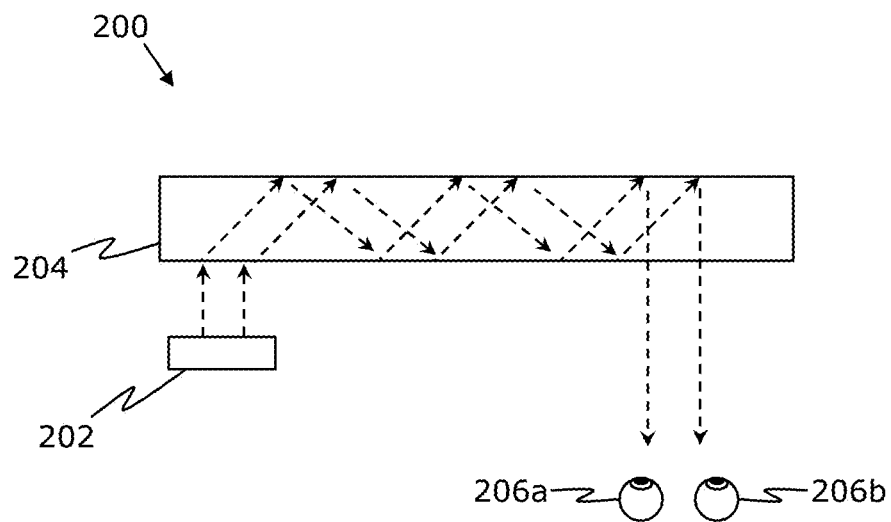
FIG. 2 is a schematic diagram of a waveguide display unit, in accordance with an embodiment of the present disclosure.

FIG. 2 is a schematic diagram of a waveguide display unit 200, in accordance with an embodiment of the present disclosure. The waveguide display unit 200 comprises a display 202 and a waveguide 204. In operation, light waves emanating from the display 202 are received at an in-coupling grating of the waveguide 204, and guided along a propagation path of the waveguide 204, as shown. An out-coupling grating of the waveguide 204 extracts the guided light waves from the waveguide 204, and redirect them towards an output port of the waveguide 204. Upon exiting from the output port, the light waves are presented as another part of a synthetic light field to eyes 206a-b of at least one user.

Figure 3:
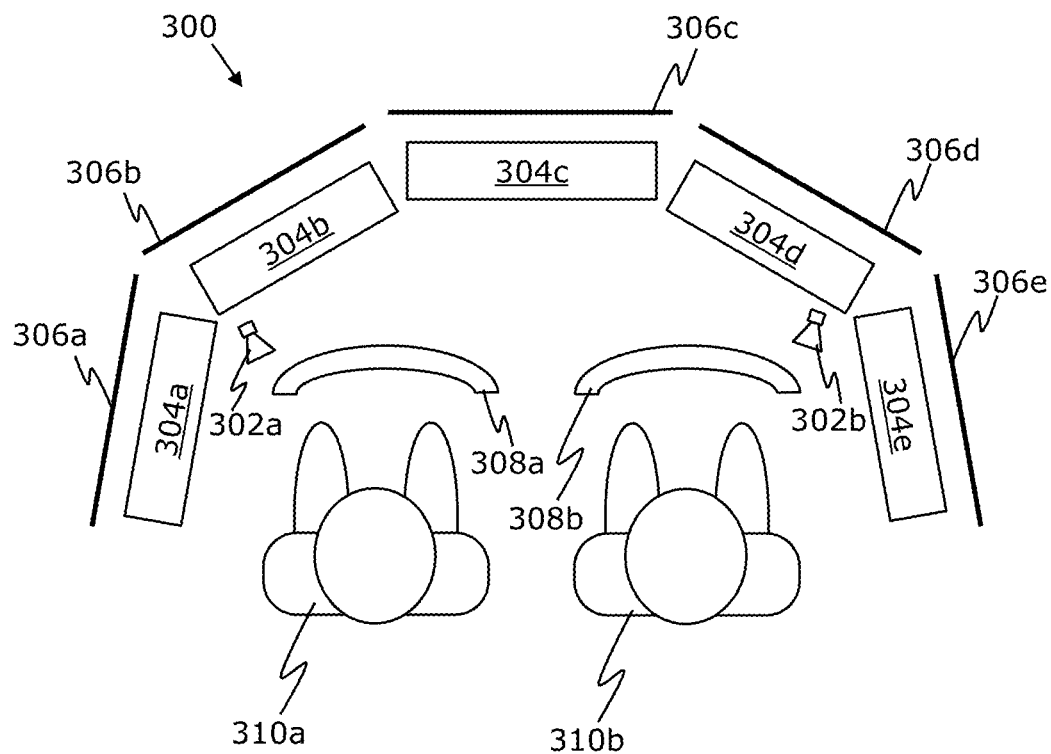
FIG. 3 illustrates a specific implementation of a system for augmenting reality with multiple light field displays and multiple waveguide displays, in accordance with an embodiment of the present disclosure.

Referring to FIG. 3, illustrated is a specific implementation of a system 300 for augmenting reality with multiple light field displays and multiple waveguide displays, in accordance with an embodiment of the present disclosure.

For illustration purposes only, the system 300 has been depicted to be implemented in an aircraft cockpit, where there are may be multiple users. The system 300 comprises tracking means 302a and 302b; at least one light field display unit, depicted as light field display units 304a-e; at least one optical combiner, depicted as optical combiners 306a-e; at least one waveguide display unit, depicted as waveguide display units 308a and 308b; and at least one processor (not shown). The optical combiners 306a-e correspond to respective ones of the light field display units 304a-e, as shown. The waveguide display units 308a and 308b are arranged on an optical path of the light field display units 304b-d. In use, the waveguide display unit 308a is arranged between a user 310a and the optical combiners 306b-c, while the waveguide display unit 308b is arranged between a user 310b and the optical combiners 306c-d. In other words, each user could have a dedicated waveguide. It will be appreciated that the optical combiners 306a-e could be implemented as windscreens of the aircraft cockpit, wherein each windscreen has a semi-reflective coating, allowing it to act as an optical combiner. The at least one processor is configured to perform various operations as described earlier.

FIGS. 2 and 3 are merely examples, which should not unduly limit the scope of the claims herein. A person skilled in the art will recognize many variations, alternatives, and modifications of embodiments of the present disclosure.

Figure 4:
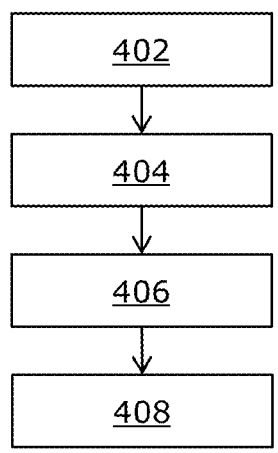
FIG. 4 depicts steps of a method for augmenting reality with light field display and waveguide display, in accordance with an embodiment of the present disclosure.

Referring to FIG. 4, illustrated are steps of a method for augmenting reality with light field display and waveguide display, in accordance with an embodiment of the present disclosure. At step 402, tracking means is utilised to determine a relative location of a head or eyes of at least one user with respect to at least one optical combiner, and a relative location of the head or the eyes of the at least one user with respect to a waveguide. The at least one optical combiner is arranged on an optical path of at least one light field display unit and on an optical path of a real-world light field of a real-world environment. The waveguide is arranged on the optical path of the at least one light field display unit, at least one waveguide display unit comprising a display and the waveguide. At step 404, an input to be employed at the at least one light field display unit for producing a part of a synthetic light field is generated, based on the relative location of the head or the eyes with respect to the at least one optical combiner. At step 406, an image to be displayed via the display of the at least one waveguide display unit for producing another part of the synthetic light field is generated, based on the relative location of the head or the eyes with respect to the waveguide. At step 408, the image is displayed via said display of the at least one waveguide display unit, whilst employing the input at the at least one light field display unit, to produce the synthetic light field. The at least one optical combiner is employed to reflect the part of the synthetic light field emanating from the at least one light field display unit towards the eyes of the at least one user, whilst optically combining said part of the synthetic light field with the real-world light field. Said part of the synthetic light field and the real-world light field are optically combined with the another part of the synthetic light field emanating from the at least one waveguide display unit.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
tracking means;
at least one light field display unit;
at least one optical combiner arranged on an optical path of the at least one light field display unit and on an optical path of a real-world light field of a real-world environment;
at least one waveguide display unit, separate from the at least one light field display unit, the at least one waveguide display unit comprising a display and a waveguide, the waveguide being arranged on the optical path of the at least one light field display unit; and
at least one processor configured to:
utilise the tracking means to determine a relative location of a head or eyes of at least one user with respect to the at least one optical combiner, and a relative location of the head or the eyes of the at least one user with respect to the waveguide;
generate an input to be employed at the at least one light field display unit for producing a first part of a synthetic light field, based on the relative location of the head or the eyes with respect to the at least one optical combiner;
generate an image to be displayed via the display of the at least one waveguide display unit for guiding along a propagation path of the waveguide and exiting the waveguide as a second part of the synthetic light field, based on the relative location of the head or the eyes with respect to the waveguide; and
display the image via said display of the at least one waveguide display unit to produce the second part of the synthetic light field exiting the waveguide, whilst employing the input at the at least one light field display unit, to produce the first part of the synthetic light field by the at least one light field display unit,
wherein the at least one optical combiner is employed to reflect the first part of the synthetic light field emanating from the at least one light field display unit towards the eyes of the at least one user, whilst optically combining said first part of the synthetic light field with the real-world light field,
further wherein said first part of the synthetic light field and the real-world light field are optically combined with the second part of the synthetic light field exiting the waveguide.

2. The system of claim 1, wherein a field of view (FOV) of the at least one waveguide display unit is narrower than an FOV of the at least one light field display unit.

3. The system of claim 1, wherein when generating the image, the at least one processor is configured to determine at least one virtual object or a portion of the at least one virtual object that lies within a field of view (FOV) of the at least one waveguide display unit from a perspective of the eyes of the at least one user, based on the relative location of the head or the eyes with respect to the waveguide,
wherein the image to be displayed via the display of the at least one waveguide display unit is generated based further on the at least one virtual object or the portion of the at least one virtual object.

4. The system of claim 3, wherein when generating the input, the at least one processor is configured to determine at least one other virtual object and/or a remaining portion of the at least one virtual object that lies outside the FOV of the at least one waveguide display unit, but lies within an FOV of the at least one light field display unit from the perspective of the eyes of the at least one user, based on the relative location of the head or the eyes with respect to the waveguide, and the relative location of the head or the eyes with respect to the at least one optical combiner, wherein the input to be employed at the at least one light field display unit is generated based further on the at least one other virtual object and/or the remaining portion of the at least one virtual object.

5. The system of claim 3, wherein the at least one processor is configured to determine whether an optical depth at which the at least one virtual object is to be presented by the synthetic light field is greater than a predefined threshold depth, wherein the image to be displayed via the display of the at least one waveguide display unit is generated based further on the at least one virtual object or the portion of the at least one virtual object, only when it is determined that said optical depth is greater than the predefined threshold depth.

6. The system of claim 5, wherein the input to be employed at the at least one light field display unit is generated based further on the at least one virtual object or the portion of the at least one virtual object, when it is determined that said optical depth is not greater than the predefined threshold depth.

7. The system of claim 3, wherein the at least one processor is configured to determine whether the at least one waveguide display unit has at least one of: a higher brightness, a higher resolution, a higher contrast, a higher dynamic range of colours, as compared to the at least one light field display unit, wherein the image to be displayed via the display of the at least one waveguide display unit is generated based further on the at least one virtual object or the portion of the at least one virtual object, only when it is determined that the at least one waveguide display unit has at least one of: a higher brightness, a higher resolution, a higher contrast, a higher dynamic range of colours, as compared to the at least one light field display unit.

8. The system of claim 3, wherein the at least one processor is configured to:

determine a portion of the at least one optical combiner that overlaps with the FOV of the at least one waveguide display unit from the perspective of the eyes of the at least one user, based on the relative location of the head or the eyes with respect to the waveguide, and the relative location of the head or the eyes with respect to the at least one optical combiner; and when generating the input to be employed at the at least one light field display unit, generate a part of the input whose corresponding part of the synthetic light field is to be reflected from said portion of the at least one optical combiner towards the eyes of the at least one user, based on the at least one virtual object or the portion of the at least one virtual object.

9. The system of claim 3, wherein the at least one processor is configured to determine, based on a tag assigned to the at least one virtual object, whether the at least one virtual object is to be displayed via the at least one light field display unit or the at least one waveguide display unit, wherein the image to be displayed via the display of the at least one waveguide display unit is generated based further on the at least one virtual object or the portion of the at least one virtual object, only when it is determined that the at least one virtual object is to be displayed via the at least one waveguide display unit.

10. A method comprising:

utilising tracking means to determine a relative location of a head or eyes of at least one user with respect to at least one optical combiner, and a relative location of the head or the eyes of the at least one user with respect to a waveguide, wherein the at least one optical combiner is arranged on an optical path of at least one light field display unit, the at least one light field display unit being separate from the waveguide, and on an optical path of a real-world light field of a real-world environment, and wherein the waveguide is arranged on the optical path of the at least one light field display unit, at least one waveguide display unit comprising a display and the waveguide;

generating an input to be employed at the at least one light field display unit for producing a first part of a synthetic light field, based on the relative location of the head or the eyes with respect to the at least one optical combiner;

generating an image to be displayed via the display of the at least one waveguide display unit for guiding along a propagation path of the waveguide and exiting the waveguide as a second part of the synthetic light field, based on the relative location of the head or the eyes with respect to the waveguide; and displaying the image via said display of the at least one waveguide display unit to produce the second part of the synthetic light field exiting the waveguide, whilst employing the input at the at least one light field display unit, to produce the first part of the synthetic light field, wherein the at least one optical combiner is employed to reflect the first part of the synthetic light field emanating from the at least one light field display unit towards the eyes of the at least one user, whilst optically combining said first part of the synthetic light field with the real-world light field, further wherein said first part of the synthetic light field and the real-world light field are optically combined with the second part of the synthetic light field exiting the waveguide.

11. The method of claim 10, wherein a field of view (FOV) of the at least one waveguide display unit is narrower than an FOV of the at least one light field display unit.

12. The method of claim 10, wherein the step of generating the image comprises determining at least one virtual object or a portion of the at least one virtual object that lies within a field of view (FOV) of the at least one waveguide display unit from a perspective of the eyes of the at least one user, based on the relative location of the head or the eyes with respect to the waveguide, wherein the image to be displayed via the display of the at least one waveguide display unit is generated based further on the at least one virtual object or the portion of the at least one virtual object.

13. The method of claim 12, wherein the step of generating the input comprises determining at least one other virtual object and/or a remaining portion of the at least one virtual object that lies outside the FOV of the at least one waveguide display unit, but lies within an FOV of the at least one light field display unit from the perspective of the eyes of the at least one user, based on the relative location of the head or the eyes with respect to the waveguide, and the relative location of the head or the eyes with respect to the at least one optical combiner, wherein the input to be employed at the at least one light field display unit is generated based further on the at least one other virtual object and/or the remaining portion of the at least one virtual object.

14. The method of claim 12, further comprising determining whether an optical depth at which the at least one virtual object is to be presented by the synthetic light field is greater than a predefined threshold depth,
wherein the image to be displayed via the display of the at least one waveguide display unit is generated based further on the at least one virtual object or the portion of the at least one virtual object, only when it is determined that said optical depth is greater than the predefined threshold depth.

15. The method of claim 14, wherein the input to be employed at the at least one light field display unit is generated based further on the at least one virtual object or the portion of the at least one virtual object, when it is determined that said optical depth is not greater than the predefined threshold depth.

16. The method of claim 12, further comprising determining whether the at least one waveguide display unit has at least one of: a higher brightness, a higher resolution, a higher contrast, a higher dynamic range of colours, as compared to the at least one light field display unit,
wherein the image to be displayed via the display of the at least one waveguide display unit is generated based further on the at least one virtual object or the portion of the at least one virtual object, only when it is determined that the at least one waveguide display unit has at least one of: a higher brightness, a higher resolution, a higher contrast, a higher dynamic range of colours, as compared to the at least one light field display unit.

17. The method of claim 12, further comprising determining a portion of the at least one optical combiner that overlaps with the FOV of the at least one waveguide display unit from the perspective of the eyes of the at least one user, based on the relative location of the head or the eyes with respect to the waveguide, and the relative location of the head or the eyes with respect to the at least one optical combiner,
wherein the step of generating the input comprises generating a part of the input whose corresponding part of the synthetic light field is to be reflected from said portion of the at least one optical combiner towards the eyes of the at least one user, based on the at least one virtual object or the portion of the at least one virtual object.

18. The method of claim 12, further comprising determining, based on a tag assigned to the at least one virtual object, whether the at least one virtual object is to be displayed via the at least one light field display unit or the at least one waveguide display unit,
wherein the image to be displayed via the display of the at least one waveguide display unit is generated based further on the at least one virtual object or the portion of the at least one virtual object, only when it is determined that the at least one virtual object is to be displayed via the at least one waveguide display unit.

* * * * *